PORTABLE ELECTRIC TYPEWRITER

Original Filed Jan. 4, 1967

INVENTORS
ANDREAS SALZBERGER
ROLF FREYBURG

BY Joseph R. Spalla
ATTORNEY

PORTABLE ELECTRIC TYPEWRITER

Original Filed Jan. 4, 1967

INVENTORS
ANDREAS SALZBERGER
ROLF FREYBURG

INVENTORS
ANDREAS SALZBERGER
ROLF FREYBURG

PORTABLE ELECTRIC TYPEWRITER

INVENTORS
ANDREAS SALZBERGER
ROLF FREYBURG

INVENTORS
ANDREAS SALZBERGER
ROLF FREYBURG

INVENTORS
ANDREAS SALZBERGER
ROLF FREYBURG

INVENTORS
ANDREAS SALZBERGER
ROLF FREYBURG

INVENTORS
ANDREAS SALZBERGER
ROLF FREYBURG

United States Patent Office 3,419,123
Patented Dec. 31, 1968

3,419,123
PORTABLE ELECTRIC TYPEWRITER

Andreas Salzberger, Frankfurt am Main, and Rolf Freyburg, Berlin, Germany, assignors, by mesne assignments, to Willy Feiler Zahlund Rechenwerke G.m.b.H., Berlin, Germany Continuation of application Ser. No. 607,317, Jan. 4, 1967. This application July 11, 1967, Ser. No. 652,628
Claims priority, application Germany, Apr. 6, 1966, F 48,869
10 Claims. (Cl. 197—17)

ABSTRACT OF THE DISCLOSURE

This invention relates to a portable electric typewriter characterized by an association of keyboard mechanism, drive train and power roll, type bar and case shift supporting and drive mechanism so located and arranged as to permit the typewriter carriage to be sufficiently rearwardly located to provide a substantially flat low silhouette machine without appreciably increasing the height and front to rear dimensions over those of manual portable typewriters; more particularly it relates to the above described arrangement having a modular keyboard mechanism characterized by triggers for rapidly dependably effecting engagement of relatively simple drive mechanisms with said power roll; and specifically it relates to the hereinabove machine arrangement having a drive train characterized by a resiliently suspended motor to eliminate shock and vibration and to minimize noise incident to the intermittent loading of said power roll.

This application is a continuation of U.S. patent application Serial No. 607,317 for Portable Electric Typewriters filed in the U.S. Patent Office on Jan. 4, 1967.

Briefly in accordance with the invention, the power roll of the machine is located below and immediately rearwardly of the rearwardmost keys of a keyboard mechanism thus permitting the orientation of the type bar segment at an angle of 45° to the rear and the placement of power roll driven type bar levers and links between said power roll and segment. The case shiftable carriage in the above compact arrangement is similarly mounted for movement between lower and upper case positions in a direction parallel to segment orientation thus providing a low silhouette machine. Further novel features of the invention providing ease of manufacture and assembly reside in a modular keyboard structure which compactly mounts the entire keyboard mechanism and which may be releasably secured to and removed from the machine without disturbing the orientation of the parts which trip an action or disturb the dip or impression control settings.

Accordingly an object of the invention is to provide a portable electric typewriter of minimum height characterized by an economy of parts and by ease of manufacture, assembly and serviceability.

Another object of the invention is in the provision of keyboard controlled trip elements for rapidly and dependably effecting engagement of a pawl into toothed engagement with a power driven snatch roll to preclude dropped characters.

Another object of the invention is in the provision of relatively simple and efficient drive mechanism for a case shiftable carriage having a minimum of elements.

Other objects and many of the attendant advantages of this invention will be readily appreciated as the same becomes better understood by reference to the following detailed description when considered in connection with the accompanying drawings in which like reference numerals designate like or corresponding parts throughout the figures thereof and wherein.

Figure 1:
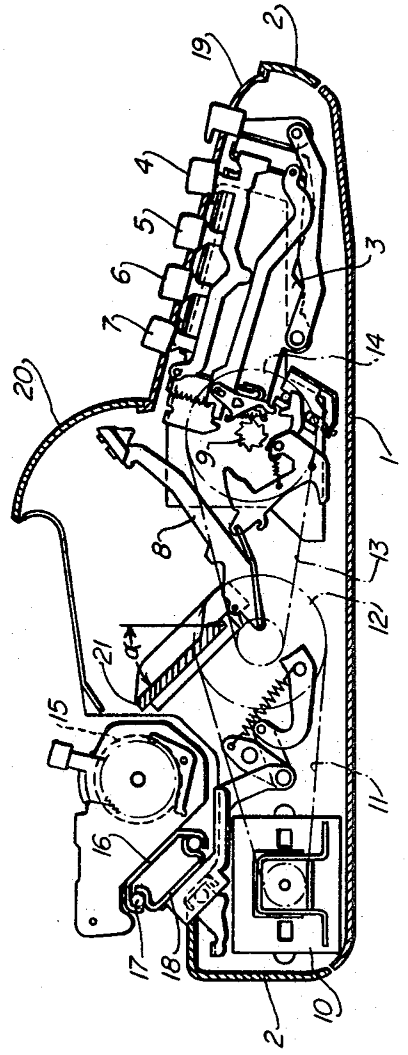
FIGURE 1 is a vertical longitudinal cross sectional view through the machine.
Figure 2:
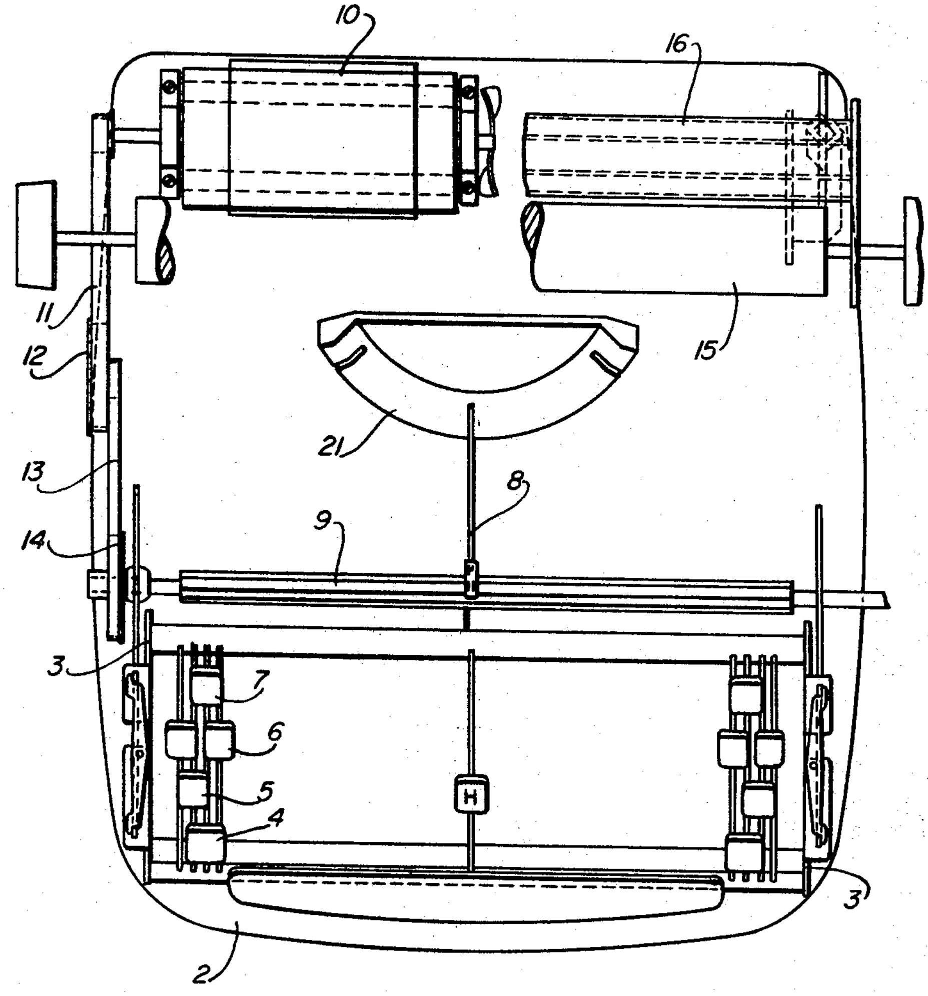
FIGURE 2 is a top view of the machine without cover and details.

Referring now to the drawings wherein like reference numerals designate like or corresponding parts throughout the several views there is shown in FIGURES 1 and 2 a main frame constituted by cast base plate 1 formed with vertically extending projections for locating and supporting mounting elements for the various parts of the machine. A shell or mask 2 connected to the base plate is employed to cover the machine. A keyboard mechanism subframe, which is releasably secured to the main frame as will hereinafter appear, comprises side plates 3 which support key actuated mechanisms comprising four rows of keys 4–7 respectively. The type bars 8 of the machine are adapted to be driven by a snatch roll 9 supported by the main frame. An electric motor 10 located at the rear of the machine is connected via pulleys and belts to continuously rotate the snatch roll 9. More particularly, a toothed belt 11 is trained between a motor pulley and a relatively large intermediate speed reducing pulley wheel 12 which in turn is connected by a belt 13 to a snatch roll mounted speed reducing pulley wheel 14. A platen 15 is rotatably mounted in a carriage frame 16 which is supported for movement in carriage return and letter feed directions by means of ball bearings 17 mounted between the carriage 16 and a shiftable main frame supported carriage bed or track 18. As shown in FIGURE 1, the keyboard mechanisms are protected by a dust cover 19. The type bars which are pivotally supported in a main frame mounted segment 21 are protected by a hood 20 removably attached to the shell of the machine.

As shown in FIGURES 1 and 2 the snatch roll is supported below and immediately rearwardly of the hindmost row of keys 7. Further the type bar segment 21 which is secured to the main frame 1 is slanted rearwardly at an angle $\alpha$ of substantially 45°. This arrangement permits a relatively simple type bar drive mechanism with a minimum of intermediate links to be placed in a compact space of minimum height below and behind the keyboard mechanism and to locate the carriage sufficiently rearwardly to keep the overall height of the typewriter low.

Figure 3:
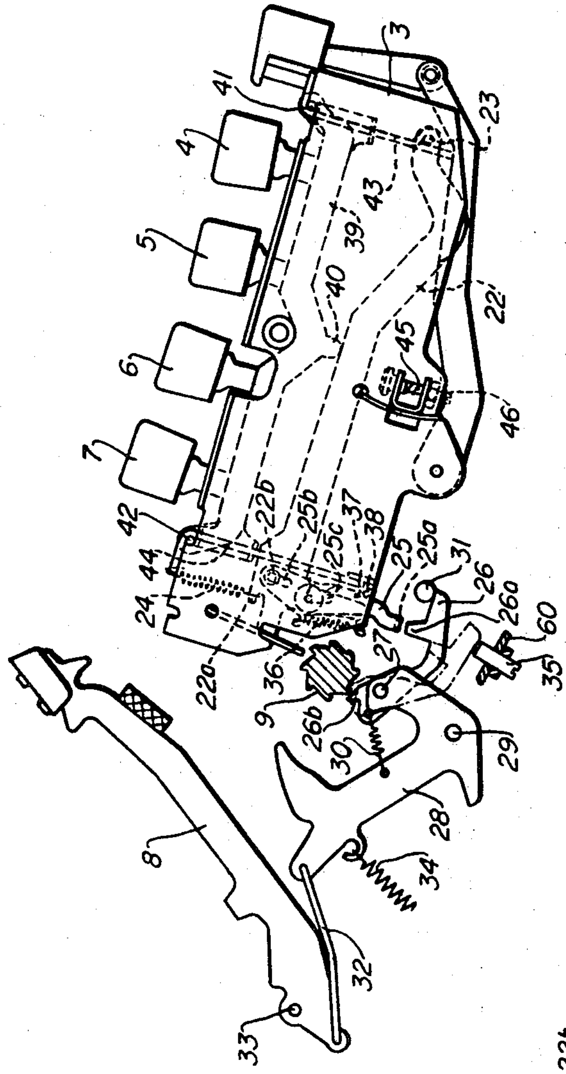
FIGURE 3 is an elevational view of a single action type bar drive.

With particular reference to FIGURE 3, the depression of a key is operative to rotate a trip or trigger element carrier lever 22 downwardly about a common carrier lever fulcrum shaft 23, which is located below the first row of keys 4, against the pull of a return spring 24 secured to a hook 22*a* formed on the upper edge of the rearwardly extending end of the carrier lever and to a rearwardly extending overlying shalf of the keyboard subframe.

The rearwardly extending end of each carrier lever has a depending projection which coextensively supports a trip or trigger element 25 whose bent over end 25*a* is operable as will hereinafter be described to hit and push an upwardly extending projection or abutment 26*a* on the upper edge of the forwardly extending tail of a pawl 26 to rapidly rotate the pawl into and to assure its engagement with the snatch roll. Each pawl 26 is rotatably mounted on an arm of a sublever 28 which extends slightly forwardly and upwardly of a common frame supported sublever fulcrum shaft 29 and terminates rearwardly of and below the snatch roll. The rear end of each pawl is provided with a tooth 26*b* which will move into the path of the downwardly moving teeth of the counterclockwise driven snatch roll when a pawl 26 is rotated by a trip element 25 against the pull of a pawl return spring 30 secured between the rear end of the pawl and a rearwardly and upwardly extending arm of an associated sublever 28.

Figures 4, 4A:
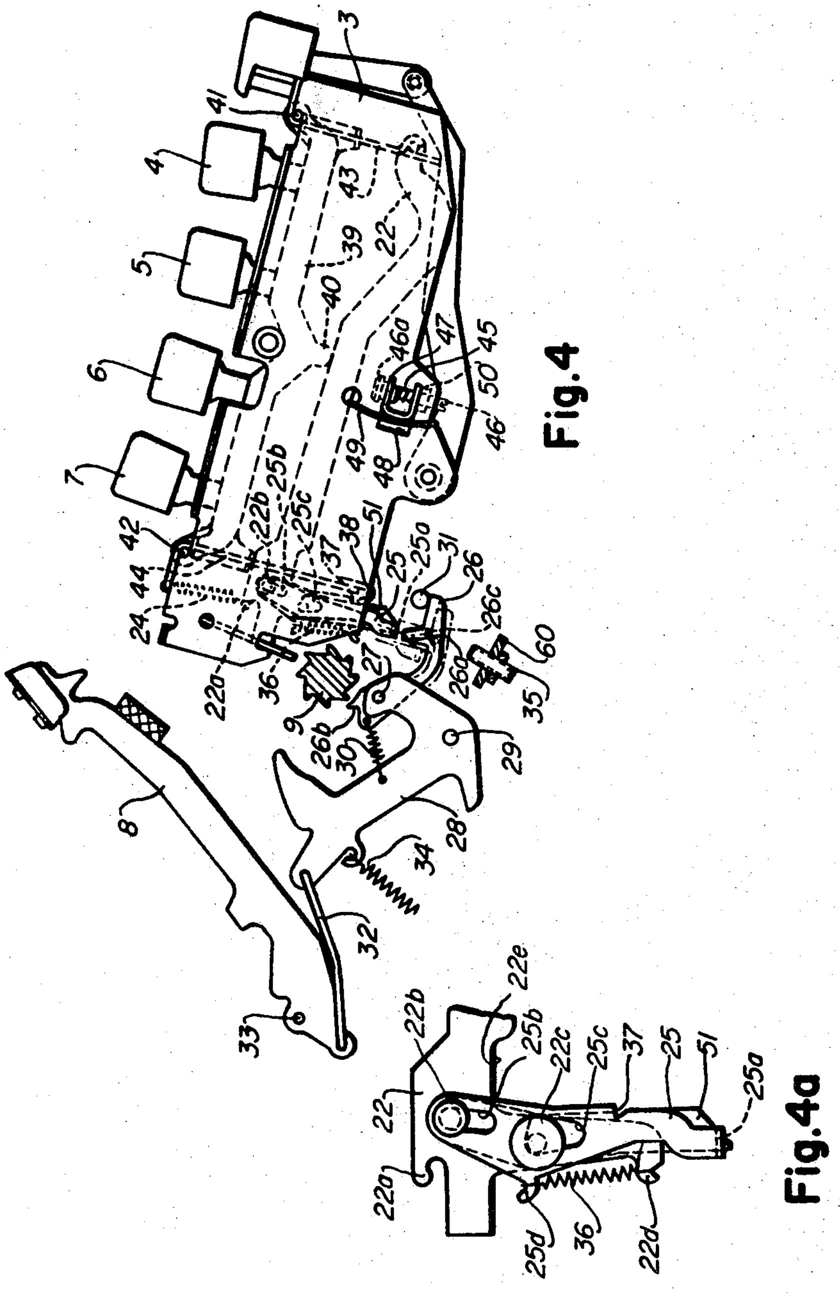
FIGURE 4 is an elevational view of a type bar drive having a repeat action.
FIGURE 4A is a view showing parts of FIGURE 4 drawn to larger scale.

A frame supported stop bar 31 located above and in the path of the forwardly extending pawl tails limits the counterclockwise movement of the pawls by the return springs 30. As shown in FIGURES 3 and 4, a rearwardly and upwardly extending arm of each sublever 28 is connected by a link 32 to the tail of a type bar 8 which is pivotally mounted on an arcuate segment supported fulcrum wire 33. The sublevers and associated type bars are held in and returned to the rest position shown in FIGURES 1 and 3 by a return spring 34.

With reference to FIGURE 3 when a pawl is rocked clockwise by a trip element, its tooth 26*b* will be engaged by the counterclockwise driven snatch roll which will rotate the pawl about its pivot 27 against the pull of its spring 30 until, as shown in dotted position, the lower edge of its forwardly extending tail comes into contact with an adjustable impression control screw 35. Up until the dotted line position is reached, no drive is transmitted to the sublever 28. Thereafter the pawl is driven or translated to the right until its tooth 26*b* can no longer be engaged by the teeth of the snatch roll. As the pawl is driven to the right, drive is transmitted to and rocks the sublever. After disengagement of the pawl from the snatch roll momentum carries the driven typebar to printing position. Thus the position of screws 35 determine how much a pawl will be allowed to rotate before it is forced to translate and thereby drive the sublever. Stated otherwise, raising the screws to limit pawl rotation earlier will increase the interval of translation and drive to the sublever and vice versa thereby controlling the angle through which a sublever and typebar are driven and consequently the force of typebar impression.

After disengagement of a pawl from the snatch roll its spring 30 will return to its rest position so that when the associated type bar has returned to rest position the pawl will be repositioned for movement by its trip element into snatch roll engagement. However, should the associated key lever remain depressed overlong, one or more repeat actions would ensue. To prevent such repeat actions, the trip elements 25 are rotatably supported by the carrier levers 22 so that as a type bar returns to rest position the upwardly extending projection 26*a* on a pawl tail will, as viewed in dotted lines in FIGURE 4, engage the right edge of the still depressed trip element 25 rocking it clockwise thereby precluding a repeat action. After release of the depressed key the trip element 25 will be elevated and returned to its FIGURE 3 rest position with its bent over end 25*a* above the projection 26*a* so that a subsequent key depression will initiate another action.

As noted above, the trip elements 25 are pivotally mounted on the carrier levers. They are also mounted for movement therealong within limits. More particularly, with reference to FIGURE 3A, a trip element 25 is shown overlying and coextensive with a depending projection of a carrier lever 22 and is provided with an elongated substantially vertically oriented slot 25*b* adjacent its upper end and with an approximately triangular cutout 25*c* intermediate its ends.

Figure 3A:
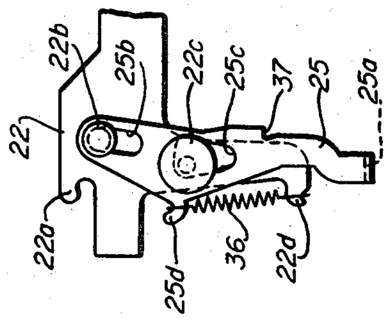
FIGURE 3A is a view showing parts of FIGURE 3 drawn to larger scale.

Toward its rear end above its depending projection each carrier lever 22 supports an upper headed pin 22*b* and the depending projection supports a lower headed pin 22*c* which project respectively into slots 25*b* and 25*c*. The lower end of each carrier lever projection is formed with a hook 22*d* which secures the lower end of a spring 36 whose upper end is secured to a hook 25*d* formed on the trip element to the left of the triangular slot thereby biasing, as viewed in FIGURE 3, the trip element downwardly and counterclockwise relative to the carrier lever pins 22*b*. The right side edge of the trip element as viewed in FIGURE 3A is formed with a notch 37 which in the position of rest illustrated lies slightly above a common hook 38 (FIGURE 3) which is connected across the side plates 3 of the keyboard subframe. On the downward movement of a carrier lever, the trip element 25 supported thereby is carried along until hook 38 engages notch 37 arresting its movement. Continued depression of the carrier lever causes the spring 36 to stretch and store energy until the lower pin 22*c* has moved along the tapered edge of triangular cutout 25*c* on the trip lever sufficient to cam the trip lever clockwise out from engagement with hook 38, which occurs shortly before the end of a downward movement of the associated key lever, whereupon the energy stored in the spring 36 propels the trip element downward causing its hitting edge to strike projection 26*a* of the pawl. By this structure the movement of the pawl tooth 26*b* into the teeth of the rotating snatch roll is effected very rapidly assuring its dependable engagement with a minimum of noise. Should the pawl tooth engage the tip of a snatch roll tooth, the hitting edge of the trip element 25 still in contact with projection 26*a* will through spring 36 resist bounce and immediately urge it back into engagement with the teeth of the snatch roll avoiding a dropped character.

With particular reference to FIGURE 4, rows of keys 4–7 are secured to key levers 39. In order to provide a substantially uniform key dip for all key levers regardless of the row in which an associated key is located, the key levers associated with keys located in rows 6 and 7 are fulcrumed on a bar 41 located in the side frames forwardly of and below the row of keys 4, while key levers 39 associated with keys located in rows 4 and 5 are fulcrumed on a bar 42 located in the side plates rearwardly of and below row 7. Each of the key levers is provided on the underside thereof intermediate its end with a depending projection 40 which normally rests on the upper edge of an associated carrier lever which as hereinabove noted is biased upwardly by return spring 24 and thereby biases the key lever upwardly; the fulcrum 41 serving as an upstop for the key levers associated with keys located in rows 6 and 7. Front and back guide combs 43 and 44 comprising the keyboard mechanism subframe guide the key levers associated with keys located in rows 4 and 5, and the key levers associated with keys located in rows 6 and 7, respectively. The rear ends of the trip element carrier 22 levers are guided in comb 44.

In that it is desirable that selected characters or functions be capable of repeat action e.g. underscore, hyphen, period letter "*x*" for purposes of obliteration, the space and backspace keys, the invention provides that key levers associated with these selected or repeat characters may be depressed through an additional dip against the resistance of a compression spring 45 (FIGURE 4) at the end of its ordinary dip through which a single drive of a type bar only is effected.

Normally the dip of the key levers is limited by engagement of the bottom edges of the carrier levers 22 with the bottom of the slots in the rear guide comb 44. Additional dip of selected or repeat keys is made possible by notching as at 22e the bottom edges of carrier levers associated therewith.

As noted above, movement of a repeat key lever beyond its normal dip will be resisted by compression springs 45 requiring further deliberate additional key lever depression to obtain a repeat action.

More particularly, as viewed in FIGURES 3 and 4 the compression springs 45 are mounted about headed screws 46 which are mounted for axial movement in a U-shaped cross bar 47 which is supported on its side within cutouts 48 in the side plates 3 located below the carrier levers and intermediate their ends. Flexible rod springs 49 secured to the side plates bias the cross bar in forward position in the cutouts 48. As viewed in FIGURE 4 screws 46 extend through the arms of the cross bar 47 and the springs 45 are located within the arms of the cross bar between a shoulder of the headed screw and the lower arm of the cross bar 47 thus urging the heads 46a upwardly. A nut 50 is threaded on the screw below the lower cross bar arm to precisely position the head 46a below the selected carrier levers 22. Thus a selected carrier lever 22 when depressed through its normal dip will be limited by the head 46a of the screw. When repeat action is desired the carrier lever is depressed further to overcome the upward pressure of spring 45.

The additional dip is operative to effect repeat action by providing on each selected carrier levers a repeat trip element 51 which is securely attached to the selected carrier lever and substantially coextensive with but on the opposite side from a movable trip element 25 by means of pins 22b and 22c which serve to guide the movable trip elements 25. The lower edge of each trip element 51 is tapered rearwardly whereby when its carrier lever is depressed through an additional dip the tapered edge will be in the path of a pin 26c extending laterally from the forward extending tail of an associated pawl below the projection 26a. Thus as a type bar 8 returns to its original or rest position, as shown in FIGURE 4, the tapered edge will be in the path of and act on pin 26a to cause its associated pawl to be rocked into engagement with the snatch roll shortly before the end of a type cycle. This repeat engagement will continue as long as a repeat key is held depressed and the associated carrier lever is held thereby in a position of additional dip.

Figure 5:
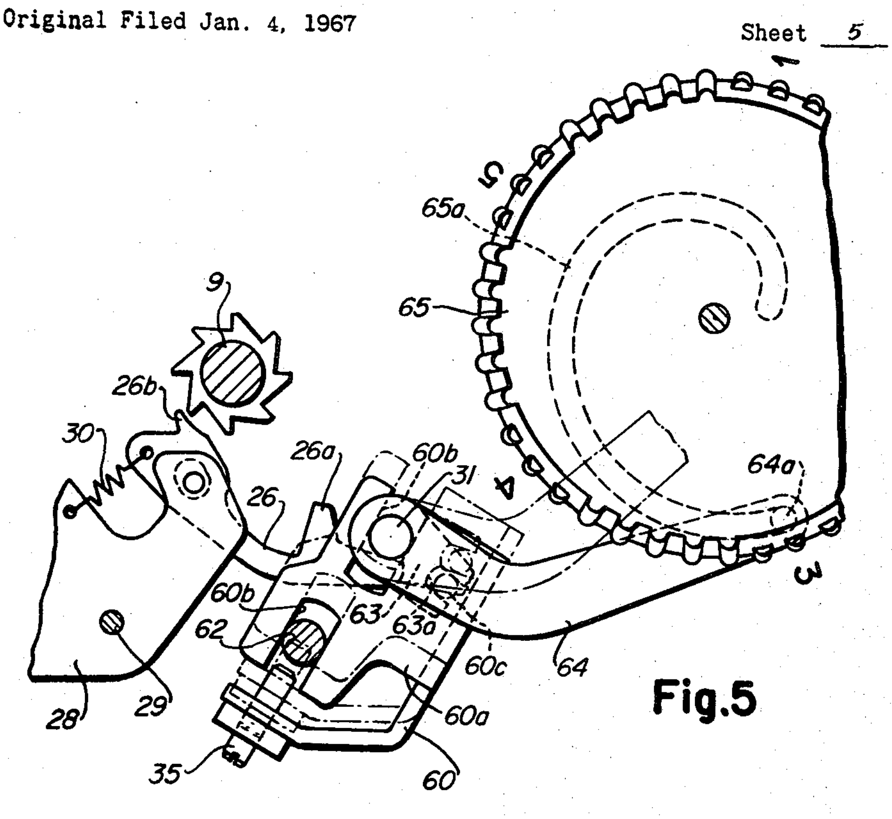
FIGURE 5 is a side elevational view showing parts of the type bar action with a control mechanism.
Figure 6:
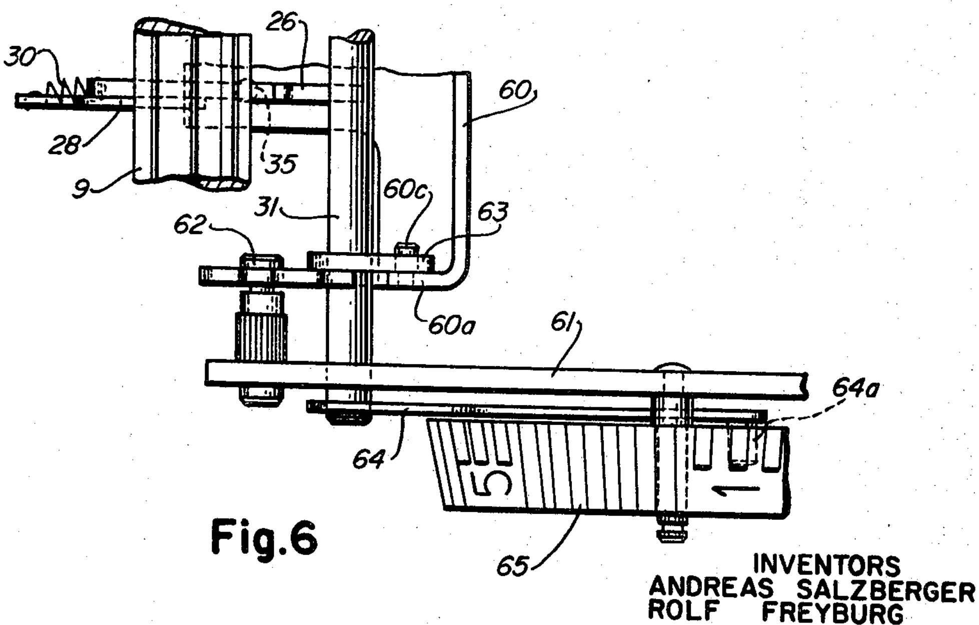
FIGURE 6 is a top view of FIGURE 5.

As hereinbefore noted the force of impression of each type bar may be separately regulated by adjustably positioning associated stop screws 35 to provide for uniform impression of all characters regardless of character area, i.e. smaller area type such as period hit at lower force than larger area characters such as a w. Thus the drive angle for a period type bar is smaller than for a w. The invention further provides a manifold control whereby the force of impression of all type actions may be simultaneouly adjusted to suit the force of impact to the number of carbon copies desired. To this end stop screws 35 are mounted in a common cross carrier 60 (FIGURES 5 and 6) which is adjustable in the direction of the stop screws. The cross carrier 60 which may be formed from sheet metal extends forwardly and upwardly from the stop supporting portion as shown in FIGURE 5. The upwardly extending portion is formed on each end with a lateral tab which is bent off rearwardly to form mounting ears 60a in which upper and lower guide slots 60b parallel to the stop screw axes are formed. Rod 31, which serves to limit the counterclockwise rotation of the pawls, is rotatably mounted in main frame portions 61 extending vertically from the machine base plate 1, and extends across the machine through the upper guide slots 60b. A guide stud 62 (FIGURE 6) extends inwardly from frame portions 61 on either side of the machine into the lower guide slots 60b. A pin 60c attached to each of the two ears 60a extends into openings 63a of bifurcated levers 63 securely fastened to rod 31. A positioning lever 64 is securely fastened at one end to the rod 31 and extends forwardly. The other forward end of the positioning lever 64 has a pin 64a which extends into a spiral shaped cam slot 65a on the inner wall of a positioning or manifold impression control wheel 65 whose periphery is knurled and carriers numbers designating reactive impact strengths. The upper part of the wheel 65 extends through an opening in cover 19 to the left of the keys. By rotatably positioning wheel 65 the cam slot 65a through pin 64a moves lever 64 causing the rod 31 and bifurcated levers 63 to rotate whereby pins 60c on the ears 60a are moved upwardly or downwardly as the case may be carrying the stop screws 35 toward or away from the pawl tails. FIGURE 5 illustrates in dotted lines the upper position of the parts.

Figure 7:
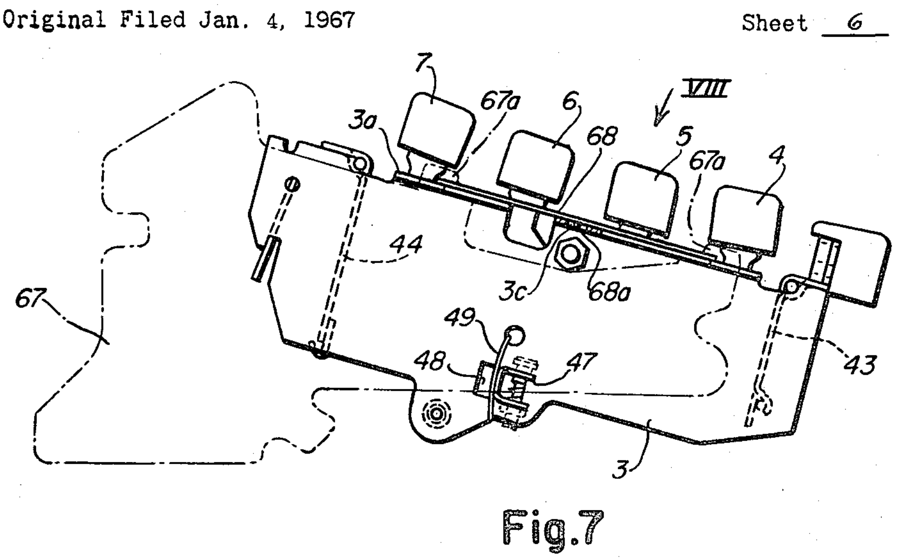
FIGURE 7 is a side elevational view of the keyboard.
Figure 8:
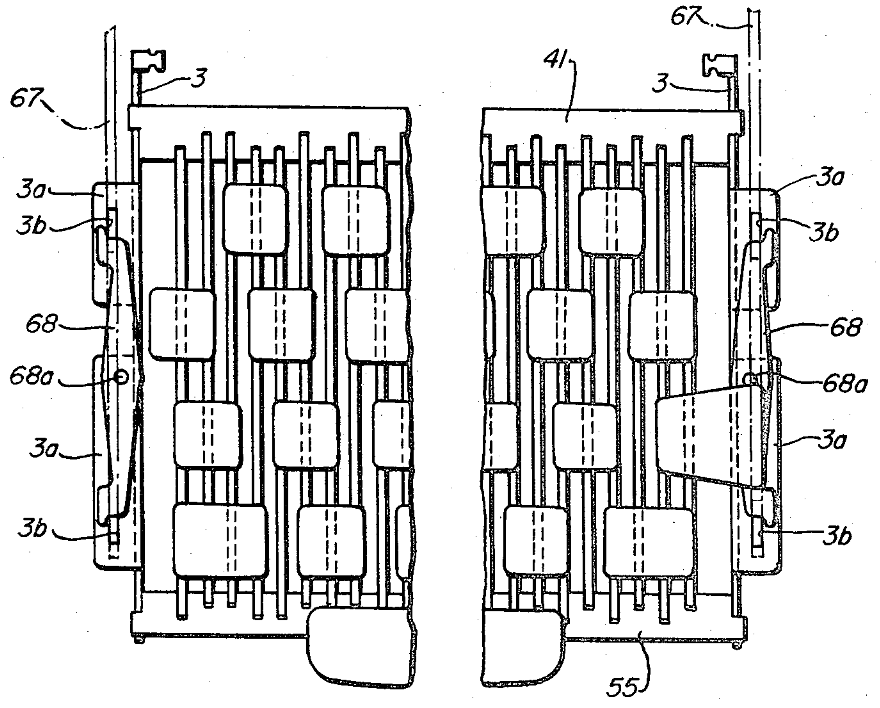
FIGURE 8 is a top view of the keyboard as shown in FIGURE 7 looking in the direction of Roman numeral VIII.

As hereinbefore noted the keyboard mechanism is releasably secured to the main frame 1 to enable assembly and disassembly for purpose of checking and repairing with a minimum amount of manipulation and without having to disturb the relationship of the connecting parts of the keyboard mechanism. More particularly, and with reference to FIGURES 7 and 8, the side plates 3 and the guide combs 43 and 44, which serve to mount hereinbefore mentioned fulcrums and to guide the key and carrier levers, are connected to form a box-like subframe which carries the key levers, carrier levers, and trip elements 25 as well as parts 45 and 50 of associated repeat actions.

The subframe side plates 3 are provided with outwardly extending ears 3a having slots 3b whereby the subframe may rest on main frame plates 67 extending vertically from the base plate of the machine with hooks 67a (FIGURE 7) formed thereon extending into the slots 3b. Holding strips 68 placed on ears 3a are pushed beneath hooks 67a to prevent removal of the keyboard subframe. Detents 68a on the underside of the strips 68 extend into holes 3c in ears 3a to secure the strips in position.

Figure 9:
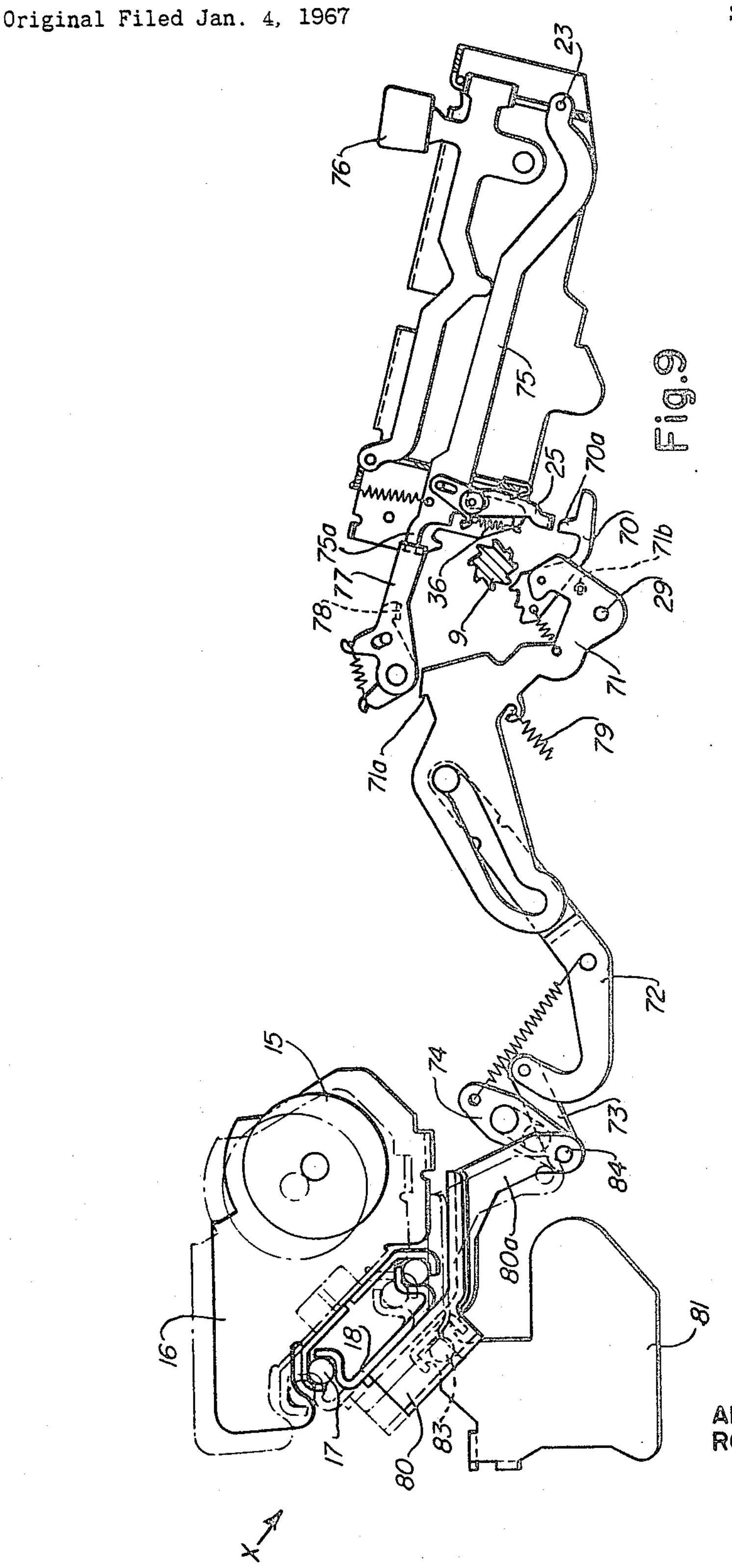
FIGURE 9 is a side elevational view of the carriage case shift mechanism.
Figure 10:
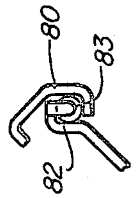
FIGURE 10 is a view of the carriage case shift mechanism in the direction of arrow X.

Referring now to the shift action and associated carriage shift mechanism shown in FIGURES 9 and 10, the depression of a shift key 76 on one of a pair of connected shift levers is operative on a shift carrier lever 75 fulcrumed as at 23 which carries an associated movable trip element 25 operative to rotate a shift pawl 70 into power roll engagement in the same manner as a type action and which trip element is, in turn, operative by the projection 70a to a non-repeat position at the end of a cycle against the action of spring 36. The shift pawl differs only in that it is provided with several teeth making a longer time of engagement possible with less strain. As in a type action pawl 70 is rotatably mounted on a sublever 71 biased by a return spring 79. A stop 71b on the sublever acts to limit pawl rotation to permit its translation. The sublever is provided with an elongated rearwardly and downwardly curved cam slot which acts on a pin extending thereinto and carried on the forward end of a link 72 to drive the link 72 counterclockwise about its pivot. The rear end of link 72 is articulately connected to one end of a link 73 whose other end is connected to the lower end of one of a pair of rock arms 74 which are secured intermediate their ends to a rock shaft pivotally supported by the main frame and which in the lower case position stand vertical to the plane of carriage bed 18. The portion of link 72 to the left of its pivot and the link 73 comprise the arms of toggle which is normally in a folded condition. When the link 72 is rocked counterclockwise the toggle moves toward an open position and rotates the rock arms 74 and rock shaft to shift the carriage upwardly as will hereinafter appear.

The shift carrier lever 75 differs from a type action carrier lever in the provision of a rearwardly extending tail 75a which extends into a slot in and is adapted to rock a lever 77 to which a supporting catch 78, mounted on the fulcrum of lever 77, is resiliently connected by a spring. Upon depression of the shift lever, the tail 75a of the carrier lever 75 rocks lever 77 clockwise which pulls, through the spring, catch 78 clockwise to a position to engage a tooth 71a formed on the upper edge of the shift sublever 71 thereby holding the latter in a shifted position the pull of sublever return spring 79 as long as the shift key is held depressed. Upon release of the shift key lever the lever 77 is rotated upwardly, as is catch 78, releasing sublever 71 whereby all parts will return to lower case positions.

The shiftable carriage bed 18 is connected on each end with a prismatic guide rail 80 (FIGURE 10) which together with an angular prismatic guide rail 82 secured to a fixed frame part 81 extending vertically from the base plate 1 forms a guide path. Ball bearings trapped within guide rails 80 and 82 provide for relatively frictionless movement of the carriage between lower and upper case positions in direction parallel to the 45° inclination of the type supporting segment 21. As shown guide rails 80 of the shiftable carriage bed 18 having end projections 80*a* which slant downwardly and forwardly substantially parallel to the direction of shift movement and are connected to the lower ends of rock arms 74 by pins 84. As shown in FIGURE 9 a spring connected between the upper end of one of the rock arms and the pivot of link 72 is normally held under tension by the weight of carriage and thus acts in concert with the links 72 and 73 to raise the carriage. With the above arrangement motorized shifting of the carriage is effected simply, reliably and in a compact manner.

As shown in FIGURES 1 and 2 the motor 10 which drives the snatch roll is located beneath the carriage toward one corner of the machine to minimize space requirements. Because of the light weight of the machine a novel motor suspension is employed to make the transfer of power from the motor to the driving parts free of shocks and vibrations and to keep at a minimum the noises and heating resulting from the running of the motor and particularly the intermittent loading incident to coupling an action to the snatch roll.

Figure 11:
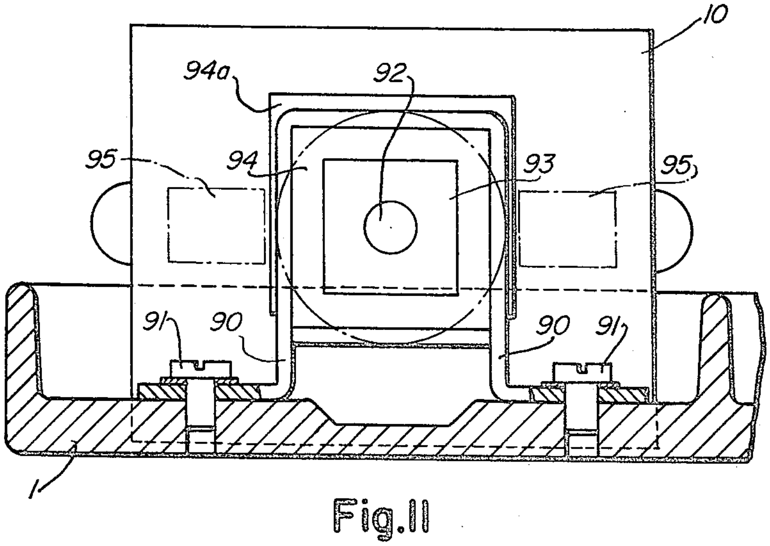
FIGURE 11 is a side elevational view of the motor mount.
Figure 12:
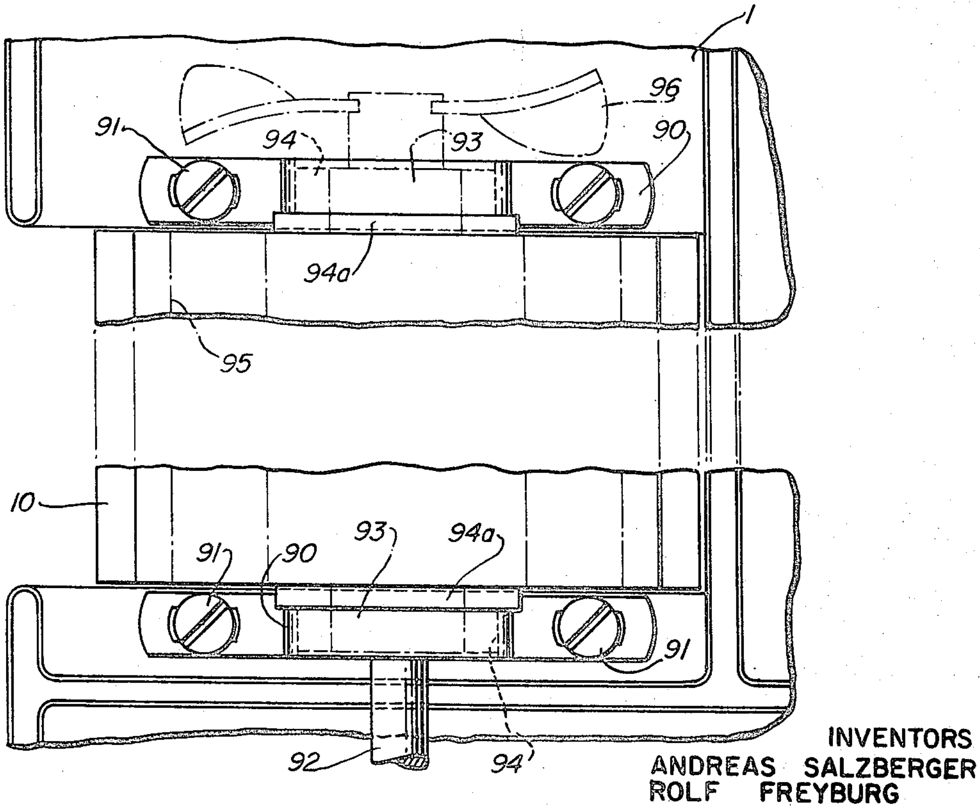
FIGURE 12 is a top view of FIGURE 11.

With reference to FIGURES 11 and 12 the motor is suspended within a cutout in base plate 1 by a rectangularly shaped bracket 90 having legs secured to the base plate by screws 91. The motor shaft 92 is supported at both ends in bearing blocks 93 having quadratic peripheries which extend into complementary shaped openings in resilient elements 94 also having quadratic peripheries which in turn are supported within the rectangular brackets 90. Each of the resilient elements 94 consisting of rubber or other equivalent sound proofing material has a flange 94*a* which rests between the housing of the motor and inside edges of the brackets. Thus the motor is resiliently suspended above the base plate 1 and the dampening material 94 catches and absorbs the shocks and vibrations coming from the motor as well as those transferred through belts 13 and 11 as a consequence of the intermittent loading of the power roll by type actions. The motor suspension as noted in FIGURE 11 is accomplished within small cross sectional areas relative to the motor housing leaving space for free passage of air driven by a fan 96 fastened to one end of the motor shaft 92 through channels 95 provided in the motor housing thereby dissipating motor heat efficiently.

It should be understood that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. A power operated typewriter having a main frame,
- a subframe secured to and forwardly of said main frame,
- key actuated means including a plurality of rows of keys mounted on said subframe,
- a continuously driven snatch roll supported by said main frame and located below and immediately rearward of the rearwardmost row of keys of said key actuated means,
- a segment secured to said main frame,
- a typebar associated with each of said key actuated mechanisms pivotally mounted on said segment,
- a sublever associated with each of said key actuated means pivotally mounted below said snatch roll and rotatably driven thereby,
- links connecting associated sublevers and typebars,
- a pawl pivotally mounted on each of said sublevers for rotation into engagement with the teeth of said snatch roll for rotation thereby,
- spring means rotatably biasing said sublevers and pawls from engagement with said snatch roll, each of said key actuated means comprising a depressible key lever fulcrumed on said subframe,
- a trip element carrier lever fulcrumed on said subframe responsive to depression of its associated key lever,
- a trip element pivotally supported by and for movement relative to its associated carrier lever,
- a spring normally restraining relative movement between each trip element and associated carrier lever,
- means for releasably holding said trip element during movement of an associated carrier lever to a trip position thereby to store energy in its associated spring; said carrier lever upon movement to a trip position effecting the release of an associated trip element whereby it is propelled by its associated spring toward and rotates an associated pawl into snatch roll engagement,
- and means in the path of said pawls for limiting power driven rotation of said pawls by said snatch roll whereby said pawls are thereafter translated until disengaged from said snatch roll, said sublevers being rocked over the interval of translation of said pawls.

2. A power operated typewriter as recited in claim 1 wherein said last named means comprises an adjustable stop individual to and in the path of power driven rotation of each pawl, all of said adjustable stops being carried by a common bar, and operator controlled means for adjustably positioning said bar.

3. In a power operated typewriter as recited in claim 1 further comprising means for releasably securing said subframe to said main frame.

4. In a power operated typewriter as recited in claims 1 wherein said typebars are pivotally mounted in a main frame supported segment inclined rearwardly at an angle of substantially 45°.

5. In a power operated typewriter as recited in claim 1 wherein said key levers support keys arranged in four rows, wherein the key levers associated with the keys located in the two rearwardmost rows are pivoted on a fulcrum located forwardly of the subframe and the key levers associated with the keys located in the two forwardmost rows are pivoted on a fulcrum located rearwardly of the subframe, and wherein said trip element carrier levers are located beneath associated key levers and are all pivoted on a fulcrum located forwardly of the subframe, said key levers having abutments intermediate the ends thereof, and springs connected to said subframe and carrier levers for biasing said carrier levers against said abutments, whereby said key levers are biased to a rest position against said fulcrums.

6. In a power operated typewriter as recited in claim 1 wherein said pawls are provided with abutments located in the path of movement of said trip elements, said abutments being operable during return of said pawls to inactive position to rotatably displace said trip elements to prevent repeat actions should associated key levers remain depressed.

7. In a power operated typewriter as recited in claim 1 wherein carrier levers associated with preselected keys are provided with fixed trip elements which are coextensive with said movable trip elements, and further comprising resilient downstops supported by said subframe to normally limit depression of said preselected carrier levers to a single action limit position, said downstops permitting further carrier lever depression to a repeat position, said fixed trip elements being operative to rotate pawls returning to rest positions to effect automatic reengagement of said pawls and snatch roll when associated key levers are depressed to repeat positions.

8. In a power operated typewriter as recited in claim 1 further comprising an electric motor connected to drive said snatch roll, said motor having an armature shaft extending to either side of said motor, bearing blocks having a quadratic periphery supporting said shaft extensions, resilient elements having a quadratic internal and external periphery supporting said bearing blocks, and means peripherally supporting said resilient elements and thereby suspending said motor.

9. In a typewriter having in combination a continuously driven snatch roll,
a type bar,
an actuator adapted to be power driven,
a spring for returning said actuator,
a pawl pivotally mounted on said actuator adapted when rocked into engagement with said power roll to drive said actuator,
a spring normally biasing said pawl from engagement,
and a link connecting said actuator and type bar, the improvement comprising,
a lever depressible to a limit,
a trip element mounted for limited movement relative to said lever,
a motion transmitting spring normally connecting said trip element for movement with said lever,
means for releasably holding said trip element during movement of said lever thereby to store energy in said spring,
and means releasing said trip element from said holding means at the limit of movement of said lever whereby said trip element is propelled by said spring to strike said pawl to thereby rock it into engagement with said snatch roll.

10. In a typewriter having in combination a frame,
a continuously driven snatch roll,
a case shiftable carriage,
an actuator,
a pawl pivotally mounted on said actuator and rockable into engagement with said power roll to drive said actuator to a shift position, means for returning said actuator,
a shift key,
lever means movable in response to depression of said shift key for rocking said pawl,
a catch positionable in response to movement of said lever means to maintain said actuator in shift position as long as said key is held depressed, said actuator having a cam slot, a first link pivoted intermediate its ends and carrying a follower pin at one end engageable with said cam slot, a second link pivotally joined at one end to the other end of said first link and forming a folded toggle therewith movable toward an open position when said actuator is driven, a pivotally mounted rock arm,
means connecting the other end of said second link and said carriage to said rock arm,
and a spring connecting said rock arm to said frame normally maintained under tension by the weight of said carriage and acting in concert with said toggle to raise said carriage to shift position when said actuator is driven.

References Cited

UNITED STATES PATENTS

| | | | |
|---|---|---|---|
| 2,049,468 | 8/1936 | Nichols | 197—71 |
| 2,239,023 | 4/1941 | Sundstrand | 197—17 |
| 2,818,151 | 12/1957 | Yaeger | 197—17 |
| 2,897,941 | 8/1959 | Dodge | 197—17 |
| 3,151,722 | 10/1964 | Salto | 197—17 |
| 3,165,190 | 1/1965 | Wenczel | 197—98 XR |
| 3,225,884 | 12/1965 | Krauss et al. | 197—17 |
| 3,250,365 | 5/1966 | Klingner et al. | 197—17 |
| 3,250,366 | 5/1966 | Rix et al. | 197—17 |

FOREIGN PATENTS 868,344 5/1961 England.

ROBERT E. PULFREY, *Primary Examiner.*

EDGAR S. BURR, *Assistant Examiner.*

U.S. Cl. X.R.

197—73